(12) United States Patent
Pullium, III et al.

(10) Patent No.: US 9,059,579 B2
(45) Date of Patent: Jun. 16, 2015

(54) SEALANT-FILLED ENCLOSURES AND METHODS FOR ENVIRONMENTALLY PROTECTING A CONNECTION

(75) Inventors: George W. Pullium, III, Garner, NC (US); Jimmy E. Marks, Dunn, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 426 days.

(21) Appl. No.: 13/529,798

(22) Filed: Jun. 21, 2012

(65) Prior Publication Data

US 2012/0255759 A1 Oct. 11, 2012

Related U.S. Application Data

(63) Continuation of application No. 12/619,946, filed on Nov. 17, 2009, now Pat. No. 8,227,696.

(60) Provisional application No. 61/115,736, filed on Nov. 18, 2008.

(51) Int. Cl.
| | |
|---|---|
| *H02G 15/08* | (2006.01) |
| *H02G 15/00* | (2006.01) |
| *H01R 4/70* | (2006.01) |
| *H02G 15/113* | (2006.01) |
| *H02G 15/117* | (2006.01) |

(52) U.S. Cl.
CPC ......... *H02G 15/003* (2013.01); *Y10T 29/49826* (2015.01); *H01R 4/70* (2013.01); *H02G 15/113* (2013.01); *H02G 15/117* (2013.01)

(58) Field of Classification Search
USPC .......................................................... 174/92
See application file for complete search history.

(56) References Cited

U.S. PATENT DOCUMENTS

| | | | |
|---|---|---|---|
| 3,223,776 A | 12/1965 | Piasecki | |
| 3,325,591 A | 6/1967 | Wahl | |

(Continued)

FOREIGN PATENT DOCUMENTS

| | | |
|---|---|---|
| CN | 1298565 C | 2/2007 |
| CN | 1933267 A | 3/2007 |

(Continued)

OTHER PUBLICATIONS

Notification of Transmittal of the International Search Report and the Written Opinion of the International Searching Authority, or the Declaration in corresponding PCT Application No. PCT/US2009/064771 mailed Jun. 7, 2011 (15 pages).

(Continued)

*Primary Examiner* — Chau N Nguyen
(74) *Attorney, Agent, or Firm* — Myers Bigel Sibley & Sajovec, PA

(57) ABSTRACT

A sealant-filled enclosure assembly for environmentally protecting a connection between cables includes a housing and a mass of sealant. The housing is selectively configurable between an open position to receive the connection and a closed position wherein the housing defines an enclosure cavity to contain the connection. The housing includes at least one sealant cavity and a port control system. The port control system includes a gate member that is selectively deflectable from a closed position, wherein the gate member blocks a cable port, to an open position, wherein the cable port is open to permit a cable to extend into the enclosure cavity through the cable port. The gate member is rigid or semi-rigid. The mass of sealant is disposed in the at least one sealant cavity.

9 Claims, 12 Drawing Sheets

(56) References Cited

U.S. PATENT DOCUMENTS

| | | |
|---|---|---|
| 3,484,541 A | 12/1969 | Campbell |
| 3,715,459 A | 2/1973 | Hoffman |
| 3,879,575 A | 4/1975 | Dobbin et al. |
| 4,451,696 A | 5/1984 | Beinhaur |
| 4,849,580 A | 7/1989 | Reuter |
| 4,859,809 A | 8/1989 | Jervis |
| 4,880,676 A | 11/1989 | Puigcerver et al. |
| 4,909,766 A | 3/1990 | Jervis |
| 5,099,088 A | 3/1992 | Usami et al. |
| 5,129,839 A | 7/1992 | VanSkiver |
| 5,140,746 A | 8/1992 | Debbaut |
| 5,347,084 A | 9/1994 | Roney et al. |
| 5,397,859 A | 3/1995 | Robertson et al. |
| 5,561,269 A | 10/1996 | Robertson et al. |
| 5,569,882 A | 10/1996 | Yokoyama et al. |
| 5,594,210 A | 1/1997 | Yabe |
| 5,763,835 A | 6/1998 | Huynh-Ba et al. |
| 5,828,005 A | 10/1998 | Huynh-Ba et al. |
| 6,169,250 B1 | 1/2001 | Bolcato |
| 6,246,003 B1 | 6/2001 | Ferris et al. |
| 6,265,665 B1 | 7/2001 | Zahnen |
| 6,333,463 B1 | 12/2001 | Bukovnik et al. |
| 7,044,761 B2 * | 5/2006 | Sokol et al. ............ 439/263 |
| 7,138,580 B2 | 11/2006 | Boutin |
| 7,341,479 B2 | 3/2008 | Boutin |
| 7,417,190 B2 | 8/2008 | Pini |
| 7,550,672 B2 * | 6/2009 | Chadbourne et al. ......... 174/92 |
| 7,950,956 B2 | 5/2011 | Hiner et al. |
| 8,063,306 B2 | 11/2011 | Zhong et al. |
| 2008/0236863 A1 | 10/2008 | King et al. |
| 2008/0254664 A1 | 10/2008 | Hiner et al. |

FOREIGN PATENT DOCUMENTS

| | | |
|---|---|---|
| CN | 101170247 A | 4/2008 |
| EP | 0 409 444 A2 | 1/1991 |
| EP | 1 760 856 A1 | 3/2007 |
| GB | 2 358 293 A | 7/2001 |
| JP | 2009/148010 A | 7/2009 |
| WO | WO 97/05671 A1 | 2/1997 |
| WO | WO 00/67354 A1 | 11/2000 |

OTHER PUBLICATIONS

Notification Concerning Transmittal of International Preliminary Report on Patentability (Chapter I of the Patent Cooperation Treaty) in corresponding PCT Application No. PCT/US2009/064771 mailed Sep. 1, 2011 (11 pages).

* cited by examiner

SEALANT-FILLED ENCLOSURES AND METHODS FOR ENVIRONMENTALLY PROTECTING A CONNECTION

RELATED APPLICATION(S)

The present application is a continuation application claiming priority from U.S. patent application Ser. No. 12/619,946, filed Nov. 17, 2009, now U.S. Pat. No. 8,227,696 which claims the benefit of and priority from U.S. Provisional Patent Application Ser. No. 61/115,736, filed Nov. 18, 2008, the disclosures of which are incorporated herein by reference.

FIELD OF THE INVENTION

The present invention relates to environmentally protective enclosures and, more particularly, to enclosures for environmentally protecting cable connections and the like.

BACKGROUND OF THE INVENTION

Sealant-filled environmentally protective enclosures are employed to protect cable connections. Such enclosures may be used to environmentally protect the connections between telecommunications signal transmission cables, the electrical power transmission cables, etc. For example, U.S. Pat. No. 5,763,835 to Huynh-Ba et al. discloses a gel-filled enclosure including a pair of cavitied bodies that are hingedly connected and closable in clam shell fashion. When the enclosure is closed about the cables, gel is typically displaced and thereby elongated and seals about a cable splice or the like.

SUMMARY OF THE INVENTION

According to embodiments of the present invention, a sealant-filled enclosure assembly for environmentally protecting a connection between cables includes a housing and a mass of sealant. The housing is selectively configurable between an open position to receive the connection and a closed position wherein the housing defines an enclosure cavity to contain the connection. The housing includes at least one sealant cavity and a port control system. The port control system includes a gate member that is selectively deflectable from a closed position, wherein the gate member blocks a cable port, to an open position, wherein the cable port is open to permit a cable to extend into the enclosure cavity through the cable port. The gate member is rigid or semi-rigid. The mass of sealant is disposed in the at least one sealant cavity.

According to embodiments of the present invention, a method for environmentally protecting a connection between cables includes providing a sealant-filled enclosure assembly including a housing and a mass of sealant. The housing is selectively configurable between an open position to receive the connection and a closed position wherein the housing defines an enclosure cavity to contain the connection. The housing includes at least one sealant cavity and a port control system. The port control system includes a gate member that is selectively deflectable from a closed position, wherein the gate member blocks a cable port, to an open position, wherein the cable port is open. The gate member is rigid or semi-rigid. The mass of sealant is disposed in the at least one sealant cavity. The method further includes: selectively deflecting the gate member to its open position to open the cable port; installing the connection in the enclosure cavity such that the cable extends into the enclosure cavity through the cable port; and closing the housing about the connection.

According to embodiments of the present invention, a sealant-filled enclosure assembly for environmentally protecting a connection between cables includes a housing and a mass of sealant. The housing is selectively configurable between an open position to receive the connection and a closed position wherein the housing defines an enclosure cavity to contain the connection. The housing includes at least one sealant cavity and a port control system. The port control system includes a gate member that is selectively deflectable from a closed position, wherein the gate member blocks a cable port, to an open position, wherein the cable port is open to permit a cable to extend into the enclosure cavity through the cable port. The mass of sealant is disposed in the at least one sealant cavity. The housing defines, when closed, a tubular extension defining a reservoir on a side of the gate member opposite the enclosure cavity. The tubular extension is configured to collect and retain in the reservoir sealant exuded from the enclosure cavity through the cable port.

Further features, advantages and details of the present invention will be appreciated by those of ordinary skill in the art from a reading of the figures and the detailed description of the embodiments that follow, such description being merely illustrative of the present invention.

DETAILED DESCRIPTION OF EMBODIMENTS OF THE INVENTION

Figure 1:
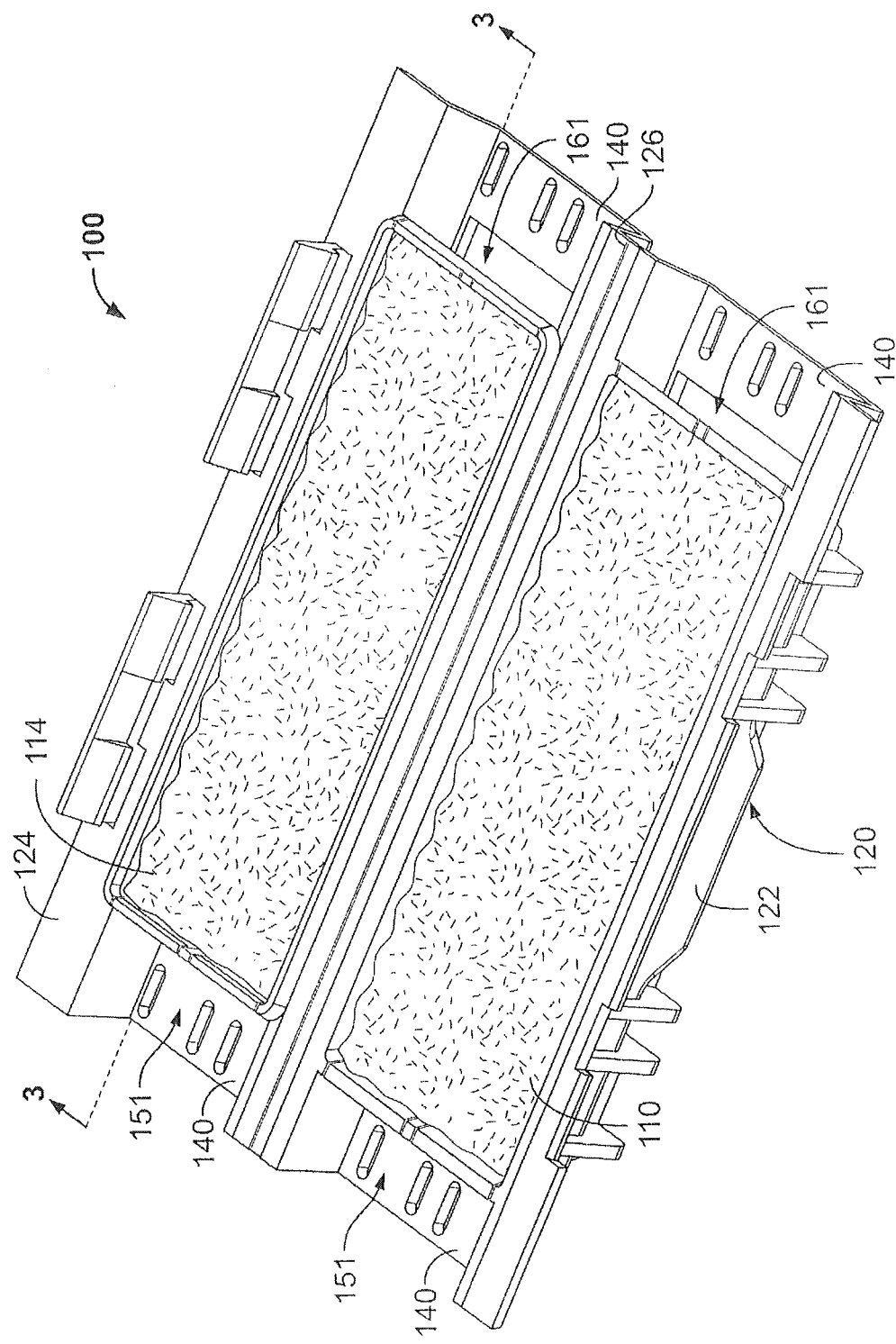
FIG. 1 is a perspective view of a sealant-filled enclosure assembly according to embodiments of the present invention in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

According to embodiments of the present invention, a sealant-filled enclosure assembly for protecting a connection includes a housing defining a cavity, and a mass of sealant disposed in the cavity. The housing includes at least one gate member that can be selectively broken away to open a cable port for entry of a cable into the cavity.

Figure 4:
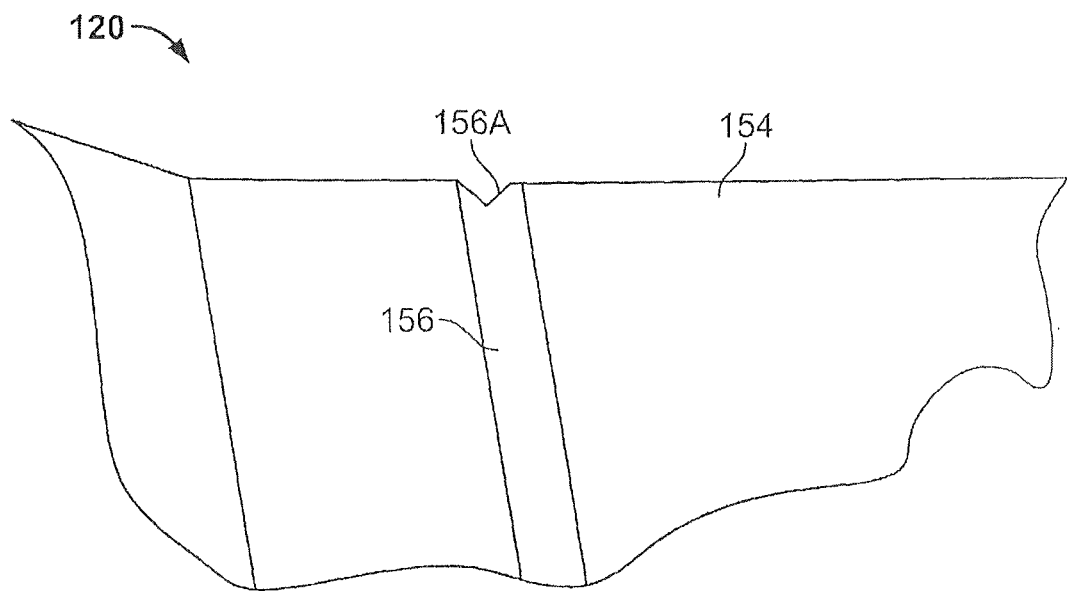
FIG. 4 is an enlarged, fragmentary view of the housing of FIG. 2.
Figure 5:
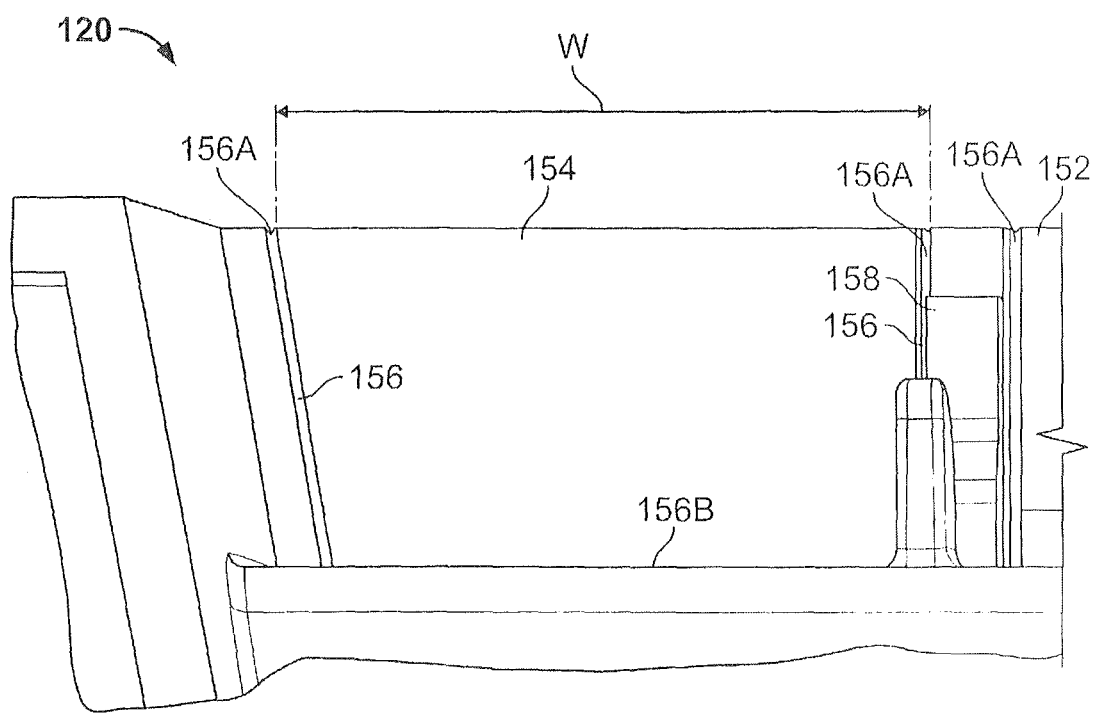
FIG. 5 is an enlarged, fragmentary view of the housing of FIG. 1.
Figure 6:
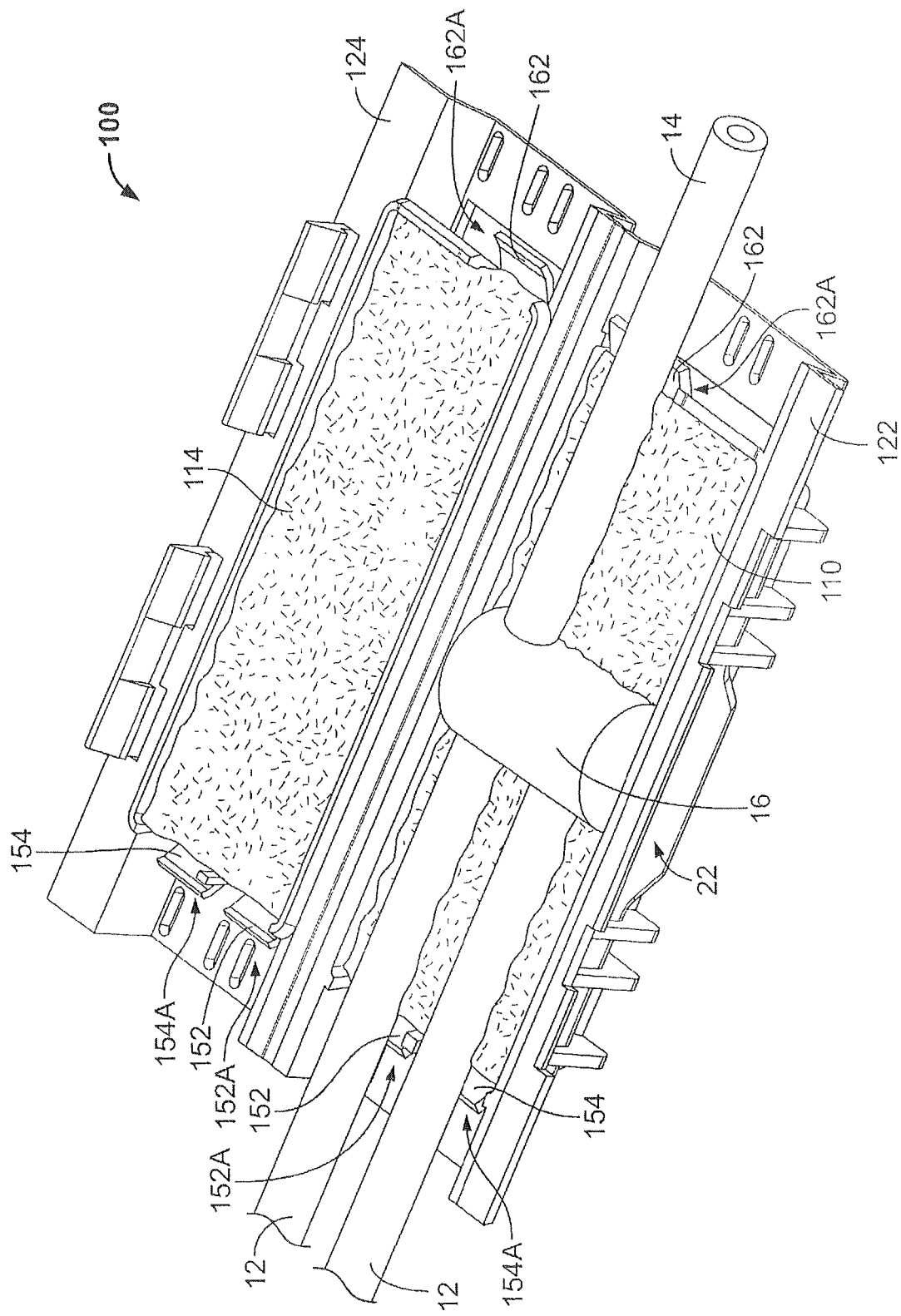
FIG. 6 is a perspective view of the sealant-filled enclosure assembly of FIG. 2 in an open position with a connection partially installed therein.
Figure 7:
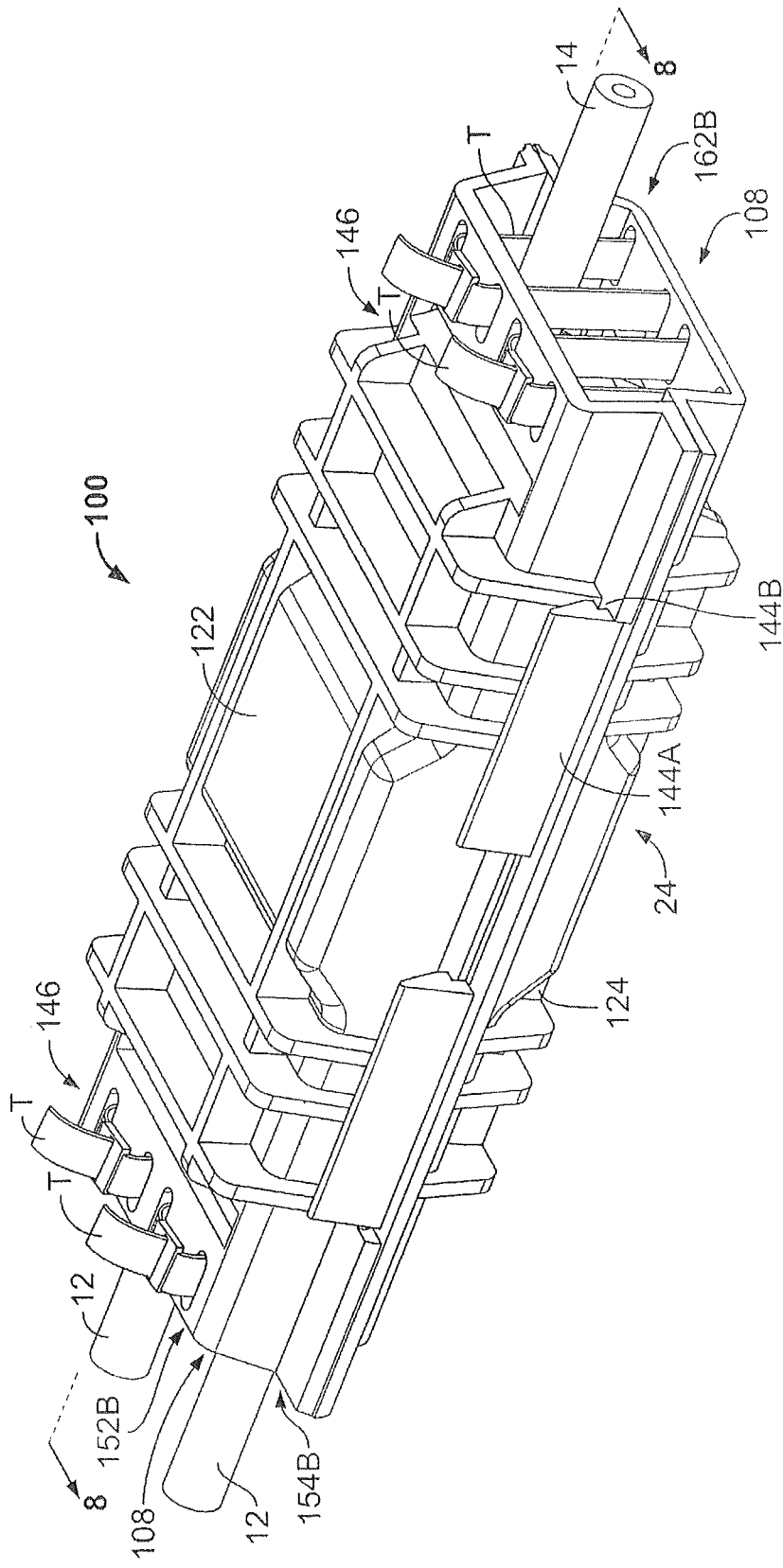
FIG. 7 is a perspective view of a protected connection assembly including the connection and the sealant-filled enclosure assembly of FIG. 1 in a closed position.
Figure 8:
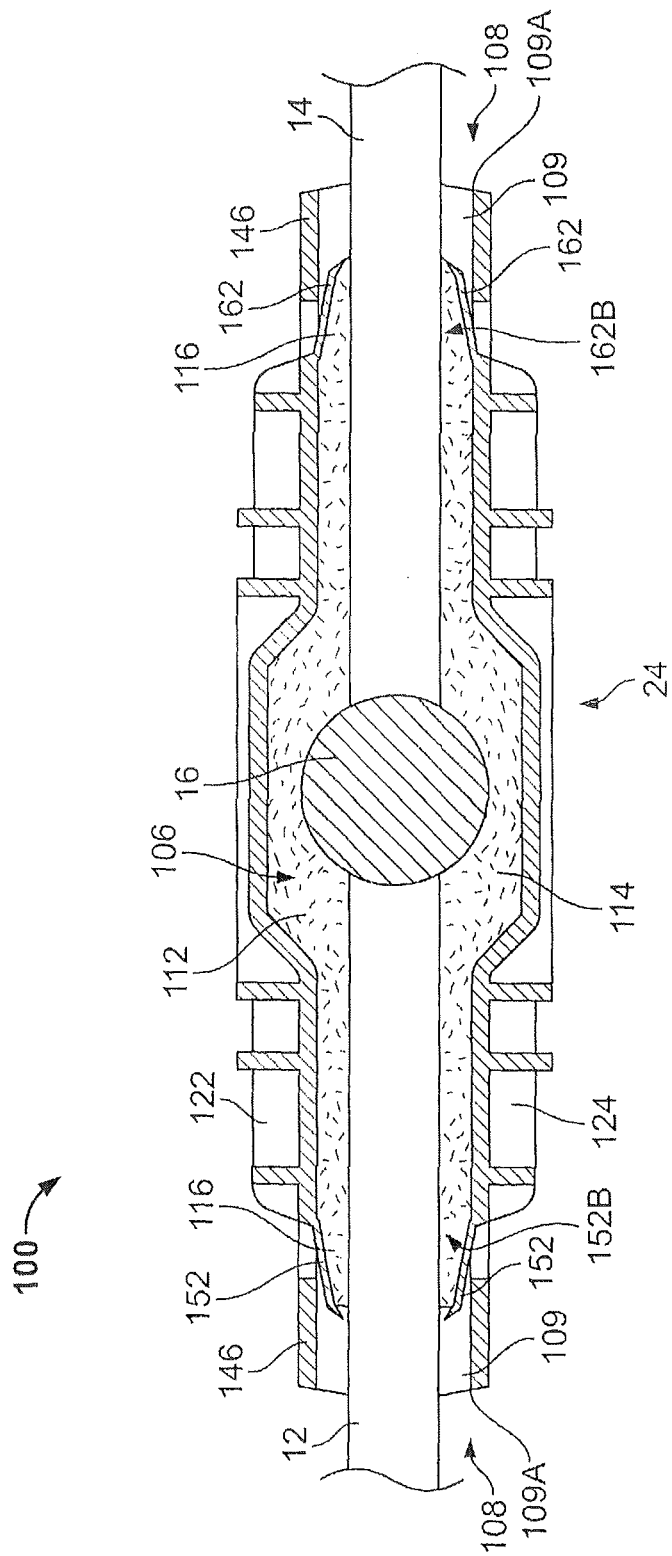
FIG. 8 is cross-sectional view of the protected connection assembly of FIG. 7 taken along the line 8-8 of FIG. 7.

With reference to FIGS. 1-8, a sealant-filled enclosure assembly 100 according to some embodiments of the present invention is shown therein. The enclosure assembly 100 is adapted to form a sealed enclosure about a connection and/or cables or the like. For example, the enclosure assembly 100 may be used to form an environmentally protective enclosure about a plurality of conductors 12, 14 (e.g., electrical power lines) joined by a connector 16 to form a connection 22 as best shown in FIGS. 6 and 8.

With reference to FIGS. 1-5, the sealant-filled enclosure 100 includes a housing 120 and masses of sealant 110, 114 disposed therein. According to some embodiments, and as discussed in more detail below, the sealant 110, 114 may be a gel. The housing 120 includes a first shell or cover member 122 and a second shell or cover member 124 joined to one another by a hinge 126 and adapted to move between an open position as shown in FIGS. 1 and 6 and a closed position as shown in FIGS. 7 and 8. In other embodiments, the cover members 122, 124 are not hinged. In the open position, the enclosure assembly 100 can receive the connection 22 and adjacent portions of the conductors 12, 14. In the closed position, the enclosure assembly 100, including the masses of sealant 110, 114, may operate to seal about and environmentally protect the connection 22. In the closed position, the enclosure assembly 100 defines an enclosure cavity 106 (FIG. 8) and opposed pairs of ports 108 (FIGS. 7 and 8) communicating with the enclosure cavity 106.

Figure 2:
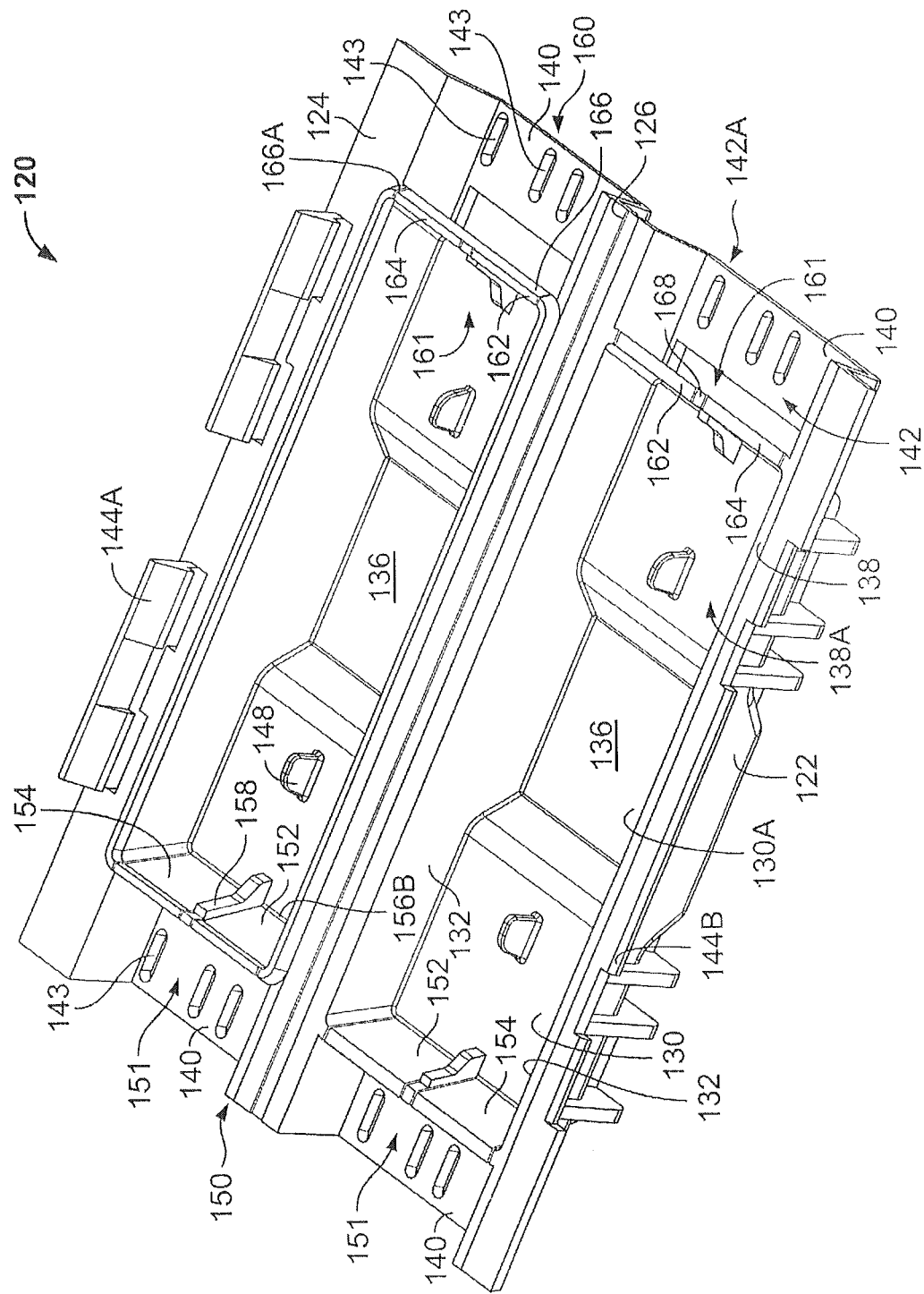
FIG. 2 is a perspective view of a housing of the sealant-filled enclosure assembly of FIG. 1 in the open position.

Turning to the housing 120 in more detail and as best seen in FIGS. 1 and 2, the cover members 122, 124 are constructed in generally the same manner, except for the configurations of the latch structures and placement relative to the hinge 126. Each cover member 122, 124 includes a bottom wall 130. A dome 130A may be defined in the bottom wall 130. Opposed side walls 132 and opposed gate structures 151, 161 extend upwardly from the bottom wall 130. Opposed pairs of locator ribs 148 extend upwardly from the bottom wall 130. Opposed extension portions 140 extend longitudinally from either end of each cover member 122, 124. Strain relief features (as shown, tie wrap holes 143) are provided in each extension 140.

The upper edges of the walls 132, 134 form a perimeter edge 138 defining an opening 138A. The walls 130, 132 of each cover member 122, 124 define an overall cover member chamber or cavity 136. Each extension portion 140 defines an extension subchannel 142 having an open end 142A. The sealants 110, 114 are disposed in the cavities 136 prior to use of the enclosure assembly 100, but, according to some embodiments and as shown in FIG. 1, not in extension subchannels 142.

The cover members 122, 124 are pivotably joined by the hinge 126. According to some embodiments, the hinge 126 is a flexible, living hinge. A living hinge may allow for unitary formation of the housing 120, as well as possible cost savings in materials and assembly. Alternatively, other hinge configurations may be employed. For example, the hinge 126 may be replaced by or supplemented with interlocking pivotally coupled hinge structures and/or a pivot pin. In some embodiments, the cover members 122, 124 may be non-hinged.

Latch structures 144A, 144B are located on the respective sidewalls 132 opposite the hinge 126. The latch structures 144A, 144B are adapted to cooperate with one another to permanently or releasably secure the housing 120 in the closed position.

The gate structures 151 of the cover members 122, 124 collectively form a port control system 150. The gate structures 161 of the cover members 122, 124 collectively form a port control system 160.

Figure 3:
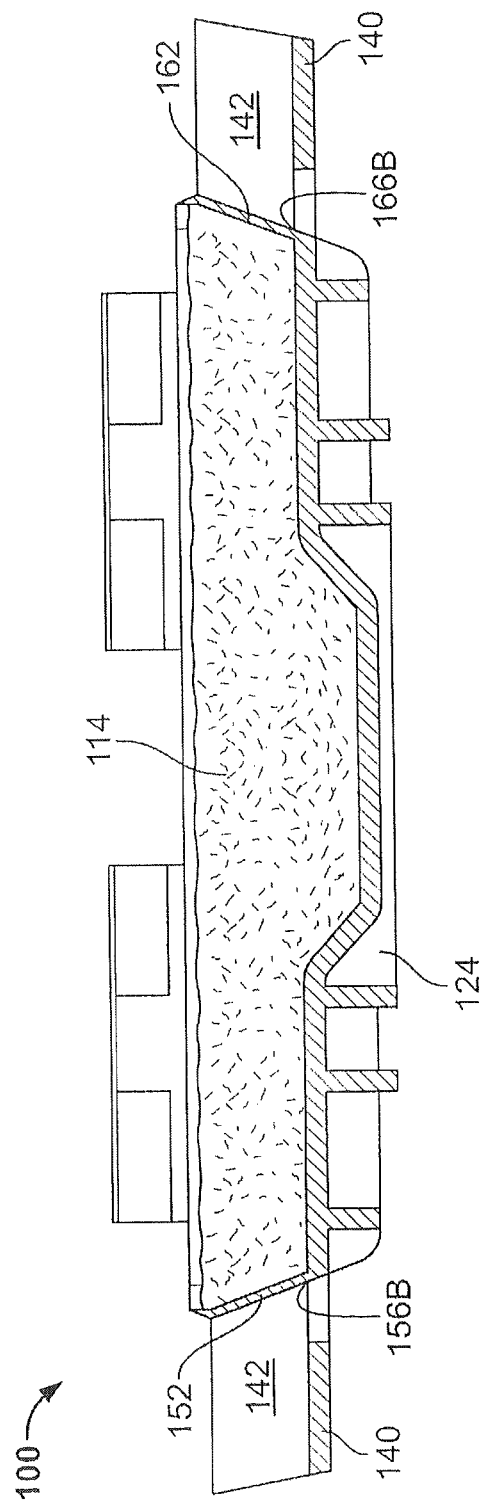
FIG. 3 is a cross-sectional view of the sealant-filled enclosure assembly of FIG. 1 taken along the line 3-3 of FIG. 1.

The gate structure 151 includes side-by-side gate members 152, 154 joined to the side walls 132 and a center or divider post 158 by frangible connection portions 156 (as seen in FIGS. 4 and 5). The gate members 152, 154 are aligned with locations where the cables may enter the enclosure. Notches 156A are provided on the lead ends of each connection portion 156 at the top edges of the gate members 152, 154. Each gate member 152, 154 is further pivotally joined to the bottom wall 130 by a living hinge 156B (FIGS. 2 and 3).

The gate structure 161 includes side-by-side gate members 162, 164 joined to the side walls 132 and a center or divider post 168 by frangible connection portions 166 (FIG. 2). The gate members 162, 164 are aligned with locations where the cables may enter the enclosure. Notches 166A are provided on the top or lead ends of each connection portion 166 at the top edges of the gate members 162, 164. Each gate member 162, 164 is further pivotally joined to the bottom wall 130 by a living hinge 166B.

According to some embodiments, each gate member 152, 154, 162, 164 is substantially rigid or semi-rigid. According to some embodiments, each gate member 152, 154, 162, 164 is a unitary panel. According to some embodiments, there are no tear or shear lines in the panels 152, 154, 162, 164. According to some embodiments, each gate member 152, 154, 162, 164 has a width W greater than the diameter of the largest cable intended to be protected using the enclosure assembly 100. According to some embodiments, the width W is in the range of from about 0.1 to 4 inches. According to some embodiments, the width W is between about 5 and 200% greater than the diameter of the largest cable intended to be protected.

The housing 120 may be formed of any suitable material. According to some embodiments, the housing 120 is formed of an electrically insulative material. In some embodiments, the housing 120 is formed of a vacuum formed or molded polymeric material. The housing 120 may be formed of polypropylene, nylon, polyethylene, ABS and/or PMMA. The housing 120 may be formed of a flame retardant material. The housing material may be any color or transparent.

The sealants 110, 114 may be any suitable sealants. According to some embodiments, the sealants 110, 114 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," $3^{rd}$ ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgard® 527 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g., Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp, of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer or like machine, having a load cell to measure force, a 5 gram trigger, and ¼ inch (6.35 mm) stainless steel probe. For measuring the hardness, for example, of a 20 mL glass vial containing 12 grams of gel, the probe is forced into the gel at the speed of 0.2 mm/sec to a penetration distance of 4.0 mm. The hardness of the gel is the force in grams required to force the probe at that speed to penetrate the gel specified for 4.0 mm. Higher numbers signify harder gels.

The tack and stress relaxation are read from the stress curve generated by tracing the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%. \qquad 1$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 70 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram.

While, in accordance with some embodiments, the sealants 110, 114 are gels as described above, other types of sealants may be employed. For example, the sealants 110, 114 may be silicone grease or hydrocarbon-based grease.

The enclosure assembly 100 may be formed in the following manner. The cover members 122, 124 and the hinge 126 may be integrally formed. According to some embodiments, the cover members 122, 124 and the hinge 126 are Unitarily molded. According to some embodiments, the entirety of the housing 120 is unitarily molded. The housing 120 may be injection molded or vacuum formed, for example. According to other embodiments (e.g., if the cover members are not hinged), the cover members 122, 124 are separately molded or otherwise formed.

If the sealant 110, 114 is a material, such as a curable gel, that requires curing, the sealant may be cured in situ.

The enclosure assembly 100 can be used as follows in accordance with methods of the present invention to form the enclosed connection 24 (FIGS. 7 and 8). The connection 22 (FIG. 6) is formed by installing the connector 16 on the conductors 12, 14. The enclosure assembly 100 is prepared for installation of the conductors by selectively opening or breaking away one or more of the gate members 152, 154, 162, 164 to define respective subports through the gate structures 151, 161. The selected gates may be pre-broken by the operator or may be broken by installation of the cables. More particularly, the selected gate members 152, 154, 162, 164 are broken away from the center posts 158, 168 and the side walls 132 and folded down about their lower hinges 156B, 166B to open the subports. For example, in the illustrated embodiment of FIG. 6, the gate members 152, 154, 162 have each been broken open to open the subports 152A, 154A, 162A. The notches 156A, 166A may help the user to initiate splitting, tearing or breach of the frangible connection portions 156, 166 to release the selected gate members 152, 154, 162, 164 from the center posts 158, 168 and the side walls 132. Typically, the gate members 152, 154 and the gate members 162, 164 will be opened as matched opposed (e.g., top and bottom) pairs (i.e., the gate members 152 of each cover member 122, 124 as a set, the gate members 154 of each cover member 122, 124 as a set, the gate members 162 of each cover member 122, 124 as a set, and/or the gate members 164 of each cover member 122, 124 as a set).

Thereafter, the enclosure assembly 100 is installed over the connection 22 and portions of the conductors 12, 14. The enclosure assembly 100 may be held in a fully or partially open position as shown in FIG. 6 and the connection 22 may be inserted between the cover members 122, 124. The enclosure assembly 100 is then closed by urging one or both of the cover members 122, 124 to relatively pivot about the hinge 126 into engagement as shown in FIG. 7, such that the latch structures 144A, 144B are made to lock in the closed position. Securing members, such as tie wraps T or the like, may be installed through the tie wrap holes 143 to secure the conductors 12, 14 in place and provide strain relief for the conductors 12, 14.

The closed housing 120 defines an enclosure cavity 106 (FIG. 8). The extension portions 140 of the cover members 122, 124 combine to form opposed tubular extensions 146. Each tubular extension 146 defines a respective sealant collection and control chamber or reservoir 109 having an end opening 109A (formed from the extension subchannels 142 and end openings 142A, collectively). Additionally, the open subports 152A, 154A, 162A combine to collectively define cable ports 152B, 154B, 162B (FIG. 7).

Upon closure of the enclosure assembly 100, the connection 22 is encapsulated within the sealant 110, 114, and the sealant 110, 114 and the connection 22 are in turn encapsulated within the housing 120 (i.e., contained within the enclosure cavity 106). The cables 12, 14 extend through the cable ports 152B, 154B, 162B, respectively. The gate members 164 remain in their closed position to prevent or inhibit the sealant 110, 114 from exuding out of the cavity 106 at their location.

As the enclosure assembly 100 is closed, the sealant 110, 114 is forcibly displaced by the connector 16 and the cables 12, 14, causing the sealant 110, 114 to flow out of the cavity 106, through the cable ports 152B, 154B, 162B, and into the extension reservoirs 109 as shown in FIG. 8. The sealant mass 116 overflowed or exuded out through the cable ports 152B, 154B, 162B is collected and retained by the surrounding walls of the extensions 146.

According to some embodiments and as illustrated, the volumes and configurations of the sealants 110, 114 are selected to ensure that the connection 22 displaces at least one, and according to some embodiments, both of the sealants 110, 114 when the enclosure assembly 100 is transitioned from the open position to the closed position with the connection 22 disposed therein. According to some embodiments, the combined volume of the connector 16, the portions of the conductors 12, 14 in the enclosure cavity 106, and the sealants 110, 114 is greater than the volume of the enclosure cavity 106.

As discussed above, according to some embodiments, each gate member 152, 154, 162, 164 is substantially rigid or semi-rigid. According to some embodiments, the stiffness of each gate member 152, 154, 162, 164 is sufficient to withstand a pressure from the interior side (i.e., the cavity 136 side) of at least 3 psi, and according to some embodiments at least 8 psi, without deforming or deflecting an amount sufficient to permit the sealant 112, 114 to pass through the corresponding cable port 152B, 154B, 162B, 164B.

According to some embodiments, the connection(s) between each gate member 152, 154, 162, 164 and the housing 120 (e.g., the frangible connection portions 156, 166) are sufficient to require at least 3 psi, and according to some embodiments at least 8 psi, of pressure on the interior side to break the gate member 152, 154, 162, 164 away and open the corresponding port 152B, 154B, 162B, 164B. According to some embodiments, a minimum gate opening force of at least 3 pounds-force, and according to some embodiments at least 8 pounds-force, must be applied to the gate member 152, 154, 162, 164 in order to open the gate member. This gate opening force may be applied by laying a cable 12, 14 over the gate member and forcing the cover members 122, 124 closed, by applying a load to the gate member by hand or using a tool to pre-break the frangible connection portions 156, 166, or by any other suitable method. According to some embodiments, the required gate opening force is selected such that an unopened gate member 152, 154, 162, 164 (i.e., a gate member having its frangible connection portions 156, 166 intact) will not be forced open by the internal pressure of the sealant 110, 114 during installation or in service with a connection within the prescribed size range, but can be deliberately broken away and opened without undue force.

By provision of the gate structures 151, 161, the enclosure assembly 100 may ensure that the housing 120 can be closed without requiring undue force, but nonetheless that the sealants 110, 114 are displaced and forced to flow about the connection 22 and the sealants 110, 114 sufficiently engage with one another at the interface between the cover members 122, 124. More particularly, the sizes of the open cable ports 152B, 154B, 162B are controlled for both egress of the sealant 110, 114 from the cavity 106 and ingress into the cavity 106. The sizes of the open cable ports 152B, 154B, 162B are well-defined and the gate members 152, 154, 162, 164 that are not opened are sufficiently rigid (e.g., free of shear lines) to substantially prevent sealant from passing through those locations. The open cable ports 152B, 154B, 162B may be somewhat larger than the cables 12, 14 extending therethrough so that an enlarged exit area is provided. The enlarged exit area can permit the sealant 110, 114 to flow outwardly through the open ports 152B, 154B, 162B due to thermal expansion of the sealant 110, 114, and also permit the sealant 110, 114 to return flow back into the cavity 106 through the open ports 152B, 154B, 162B due to thermal contraction. The returned sealant can thus again provide the desired internal compressive force and sealing advantage within the cavity 106.

The extensions 146 can also enable or facilitate closure and effective installation of the enclosure assembly 100. The walls of each extension 146 can confine the overflowed sealant 116 to retain the sealant 116 within the housing 120. The extension reservoirs 109 may effectively function as extensions of the cavity 106, albeit on sides of the gate structures 151, 161 and cable ports 152B, 154B, 162B opposite the cavity 106. In this manner, the extension 146 may protect the sealant 116 and allow the sealant 116 to be confined to a specified volume during thermal expansion.

As will be appreciated from the description herein, the sealant 110, 114 engages portions of the conductors 12, 14 to form seals thereabout. The sealant 110, 114 also forms a sealing block that surrounds the connector 16, thereby sealing the connector 16. Notably, in the illustrated enclosure assembly 100, the sealants 110, 114 connect with one another to encapsulate the connector 16 and conductors 12, 14.

The enclosure assembly 100 may be sized and configured to accommodate and seal multiple or a-range of sizes of connectors 16 and conductors 12, 14.

While two gate members 152, 154, 162, 164 are provided at each end of the housing 120, more or fewer gate members (and thereby more or fewer defined ports) may be provided. For example, one or both ends may include three or more gate members connected by intervening rigid posts 158, 168. In some embodiments, one or both ends are provided instead with only a single gate member to provide only a single available cable port, and the single gate member may fully span the distance between the opposed side walls 132.

The enclosure assembly 100 may provide a number of advantages. The enclosure assembly 100 may provide a reliable seal about the connection 22. This seal may prevent or inhibit the ingress of moisture that would otherwise cause corrosion of the connection 22. The sealant 110, 114, particularly gel sealant, may accommodate conductors of different sizes within a prescribed range. The interfacing sealant masses 110, 114 and the relationship between the connector or connection volume and the sealant volumes may ensure that a suitable seal is provided by and between the sealants for a broadened range of size connections 22 positioned in the enclosure assembly 100.

When the sealant 110, 114 is a gel, the conductors 12, 14 and the housing 120 may apply a compressive force to the sealant 110, 114 as the assembly 100 is transitioned from the open position to the closed position. The gel may thereby be elongated and be generally deformed and substantially conform to the outer surfaces of the connector 16, the conductors 12, 14 and to the inner surface of the housing 120. Some shearing of the gel may occur as well. At least some of the gel deformation may be elastic. The restoring force in the gel resulting from this elastic deformation generally causes the gel to operate as a spring exerting a force between the housing 120 and the connector 16 and the conductors 12, 14. The compressive loading and restoring force are maintained by the closure of the cover members 122, 124.

Various properties of the gel as described above may ensure that the gel sealant 110, 114 maintains a reliable and long lasting seal between the housing 120 and the connector 16 and the conductors 12, 14. The elastic memory of and the retained or restoring force in the elongated, elastically deformed gel generally cause the gel to bear against the mating surfaces of the connector 16, the conductors 12, 14 and the interior surface of the housing 120. Also, the tack of the gel may provide adhesion between the gel and these surfaces. The gel, even though it is cold-applied, is generally able to flow about the connector 16, the conductors 12, 14 and the housing 120 to accommodate their irregular geometries.

According to some embodiments, the sealant 110, 114 is a self-healing or self-amalgamating gel. This characteristic, combined with the aforementioned compressive force between the connector 16, conductors 12, 14 and the housing 120, may allow the sealant 110, 114 to re-form into a continuous body if the gel is sheared by the insertion of the conductors 12, 14 into the enclosure assembly 100. The gel may also re-form if the connector 16 and conductors 12, 14 are withdrawn from the gel.

The sealant 110, 114, particularly when formed of a gel as described herein, may provide a reliable moisture barrier for the conductors 12, 14 and the connector 16, even when the enclosure assembly 100 is subjected to extreme temperatures and temperature changes. The housing 120 may be made from an abrasion resistant material that resists being punctured by the abrasive forces.

The gel sealant may also serve to prevent or inhibit corrosion of the connection 22 by depositing a layer of oil from the gel on the exposed surfaces of the connector 16 and conductor portions 12, 14 in the enclosure cavity 106. Even if the gel is removed from the connection 22, the oil may remain to coat the connection surfaces as a barrier to moisture.

As will be appreciated from the description herein, enclosure assemblies according to the present invention may be provided as pre-formed and fully assembled units, with pre-cured gel or other sealant therein as described above, that may be cold applied about a connection to form a seal.

While, in accordance with some embodiments, the housing 120 is integrally and unitarily formed, the housing may be otherwise formed in accordance with some aspects of invention. For example, the cover members 122, 124 and/or the hinge 126 may be separate parts joined together in hinged fashion or otherwise. For example, the cover members 122, 124 may be separate pieces secured together by tie wraps, snaps, latches or the like and/or not hinged.

It will be appreciated that enclosures in accordance with the present invention may have components (e.g., cover members, walls, etc.) and cavities or chambers having shapes, configurations and/or sizes different than those shown and described herein.

According to some embodiments, the conductors 12, 14 are power transmission conductors. According to some embodiments, the conductors 12, 14 are aerial power transmission conductors. According to some embodiments, the conductor 14 is a main line electrical conductor and the conductor 12 is a tap line electrical conductor. According to some embodiments, the conductors 12, 14 each include a plurality of elongate strands (e.g., helically wound strands). According to some embodiments, the conductors 12, 14 are signal transmission conductors. The conductors 12, 14 may be insulated or uninsulated.

Figure 9:
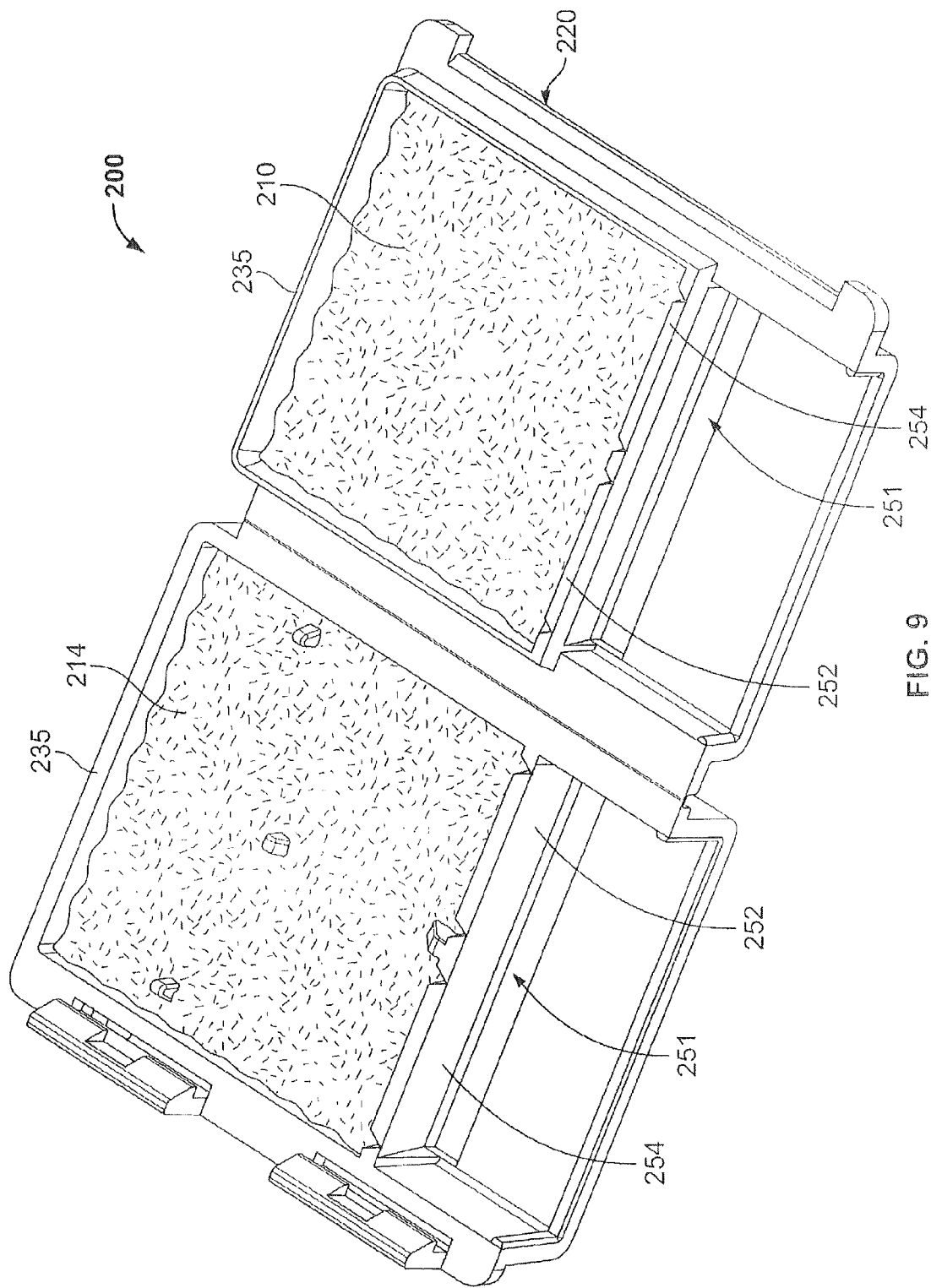
FIG. 9 is a perspective view of a sealant-filled enclosure assembly according to further embodiments of the present invention in an open position.
Figure 10:
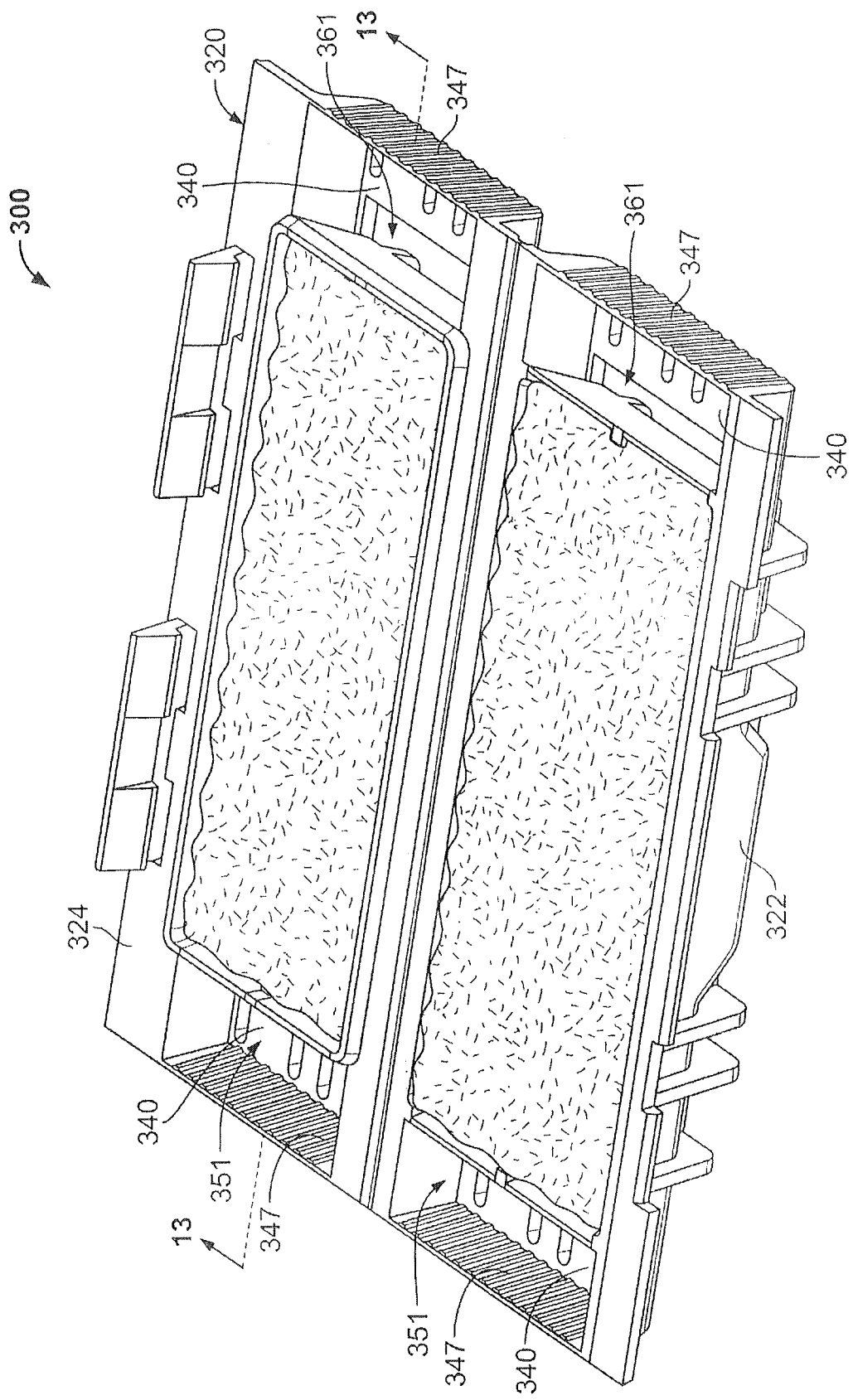
FIG. 10 is a perspective view of a sealant-filled enclosure assembly according to further embodiments of the present invention in an open position.
Figure 11:
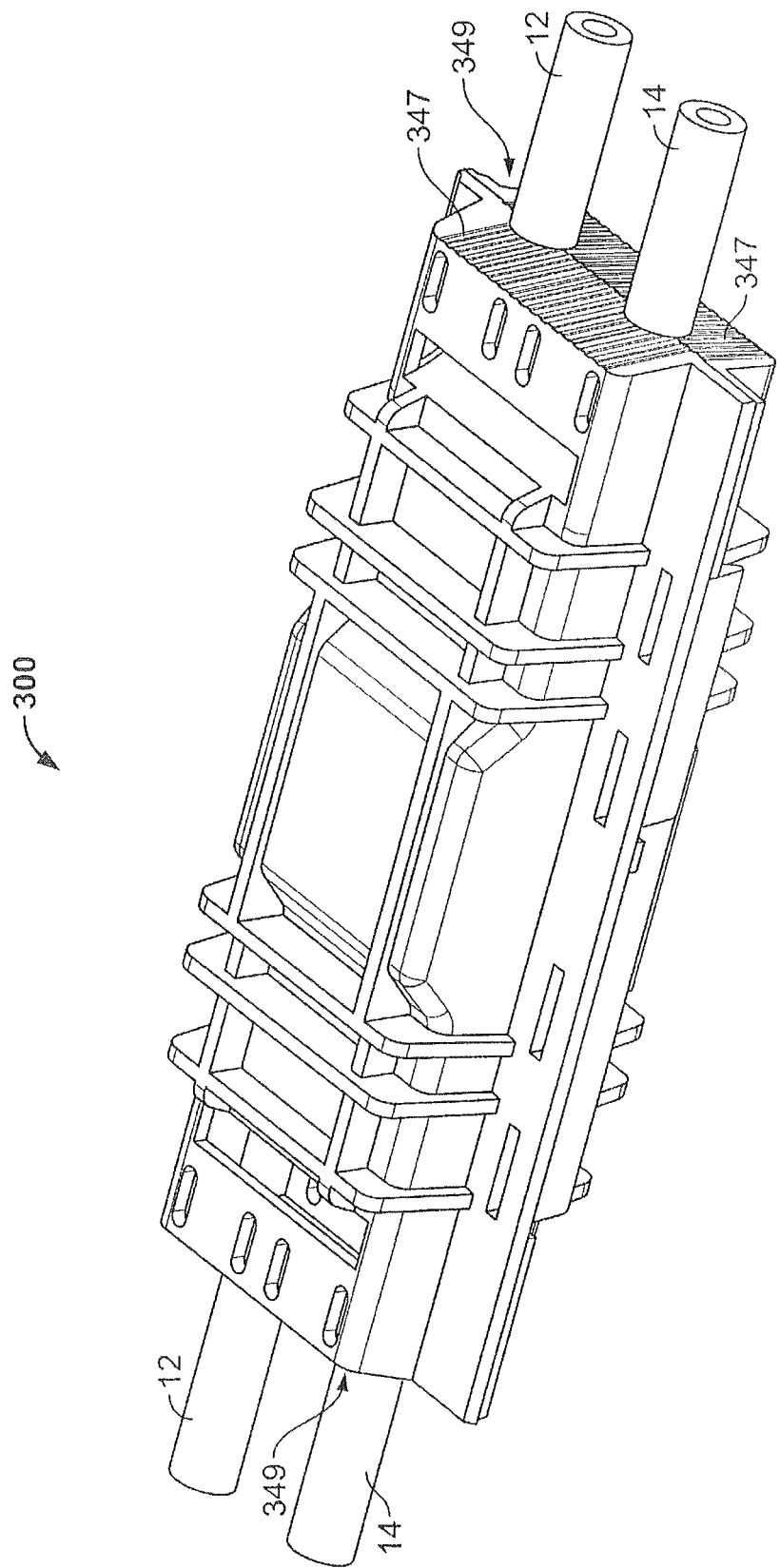
FIG. 11 is a perspective view of a protected connection assembly including a connection and the sealant-filled enclosure assembly of FIG. 10 in a closed position.
Figure 12:
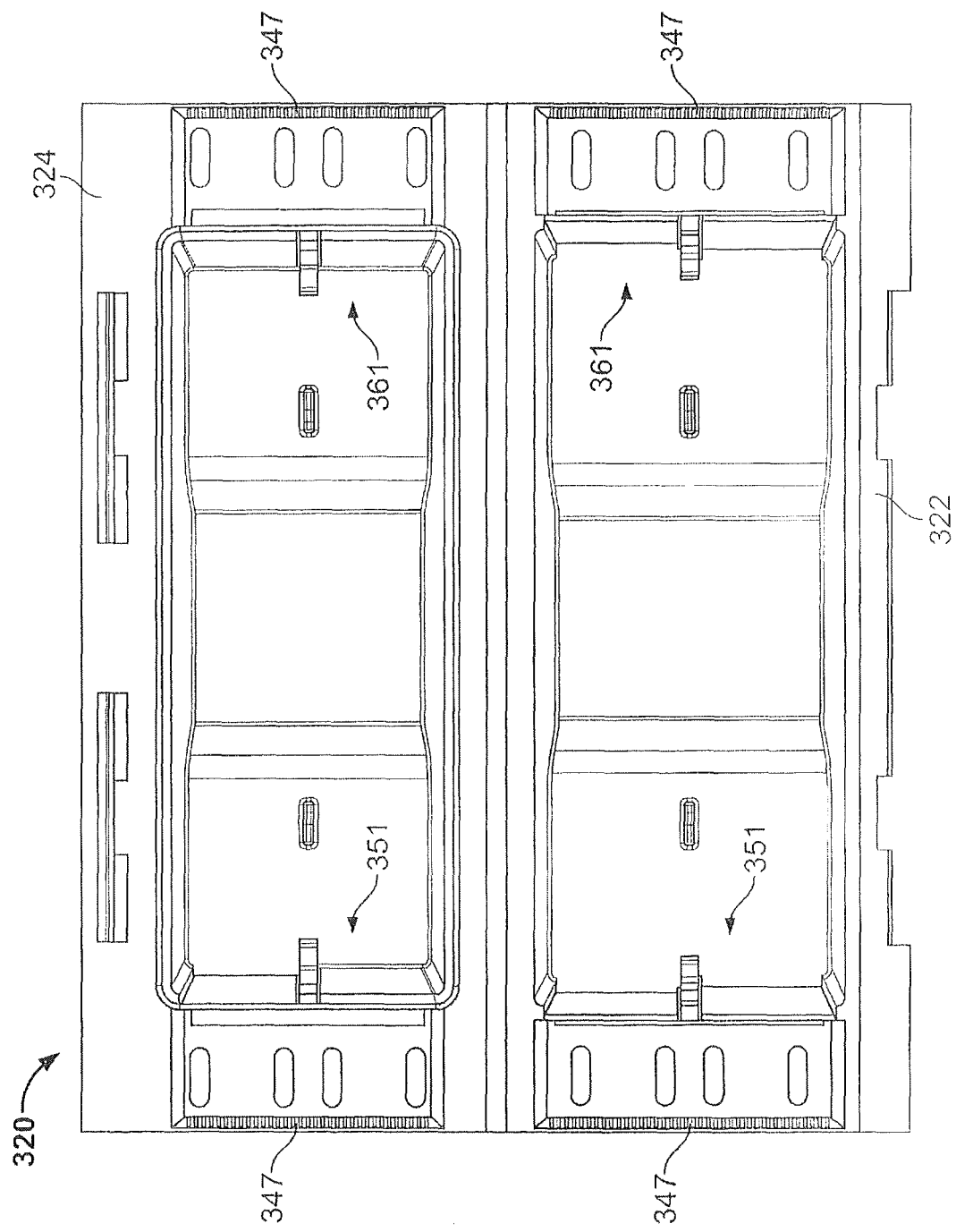
FIG. 12 is a top plan view of a housing of the sealant-filled enclosure assembly of FIG. 10 in the open position.
Figure 13:
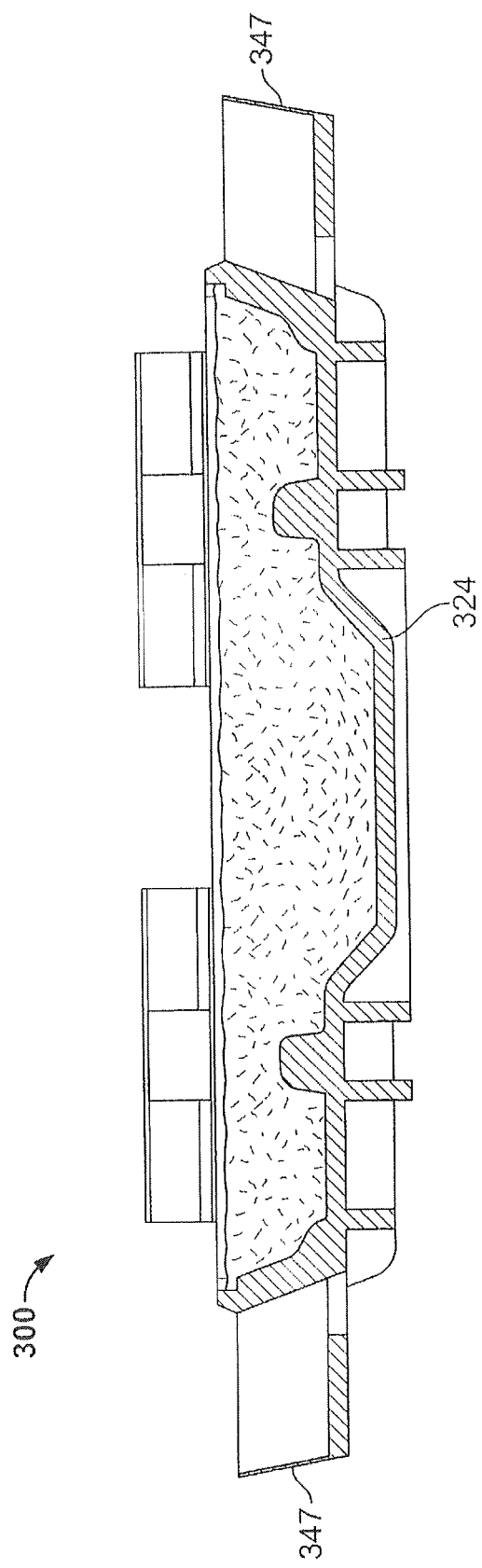
FIG. 13 is a cross-sectional view of the sealant-filled enclosure assembly of FIG. 10 taken along the line 13-13 of FIG. 10.

With reference to FIG. 9, a sealant-filled enclosure assembly 200 according to further embodiments of the present invention will now be described. The enclosure assembly 200 includes sealant 210, 214, corresponding to the sealant 110, 114, and a housing 220. The enclosure assembly 200 differs from the enclosure assembly 100 in that the housing 220 has fixed, solid end walls 235 opposite gate structures 251 corresponding to the gate structures 151. The gate structures 251 include gate members 252, 254 that can be selectively opened as discussed above to provide cable ports. The enclosure assembly 200 can be used to cover a pigtail or stub connection, for example.

With reference to FIGS. 10-13, a sealant-filled enclosure assembly 300 according to further embodiments of the present invention will now be described. The enclosure assembly 300 corresponds to the enclosure assembly 100 except that the housing 320 of the enclosure assembly 300 further includes end walls 347 on each cover member 322, 324 across the ends of the extension portions 340. When the housing 320 is closed, the end walls 347 combine to form opposed end walls 349 (FIG. 11) spaced apart from the gate structures 351, 361. According to some embodiments, the end walls 347 are frangible. For example, the end walls 347 may comprise a series of narrow fingers joined by relatively thin, tearable membranes.

In use, the installed conductors 12, 14 will break or splay the frangible walls 347 so that the conductors pass therethrough and are generally surrounded thereby. The end walls 347 may be angled outwardly so that they tend to be splayed outwardly by the conductors. The combined end walls 349 (FIG. 11) aid in preventing or impeding outside objects from entering the housing 320 along the conductor.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for environmentally protecting a connection between cables, the method comprising:
  providing a sealant-filled enclosure assembly including:
    a housing selectively configurable between an open position to receive the connection and a closed position wherein the housing defines an enclosure cavity to contain the connection, wherein the housing has a housing end through which a cable can be received and includes:
    at least one sealant cavity; and
    a port control system including:
      a first gate member that is selectively deflectable from a closed position, wherein the first gate member blocks a first cable port, to an open position, wherein the first cable port is open; and
      a second gate member that is selectively deflectable from a closed position, wherein the second gate member blocks a second cable port, to an open position, wherein the second cable port is open to permit a second cable to extend into the enclosure cavity through the second cable port;
      wherein the first and second gate members are located laterally side-by-side on the housing end; and
      wherein each of the first and second gate members is rigid or semi-rigid and is free of tear and shear lines; and
    a mass of sealant disposed in the at least one sealant cavity;
  selectively deflecting the first gate member to its open position to open the first cable port;
  selectively deflecting the second gate member to its open position to open the second cable port;
  installing the connection in the enclosure cavity including installing the first cable in the first cable port and installing the second cable in the second cable port such that the first cable extends into the enclosure cavity through the first cable port and the second cable extends into the enclosure through the second cable port; and
  closing the housing about the connection;
  wherein the step of deflecting the first gate member into its open position to open the first cable port and the step of deflecting the second gate member into its open position to open the second cable port each precede the step of installing the first cable in the first cable port and installing the second cable in the second cable port.

2. The method of claim 1 wherein the first gate member is a unitary gate panel.

3. The method of claim 1 wherein the first gate member has a gate width greater than the diameter of the largest cable intended to be protected using the sealant-filled enclosure assembly.

4. The method of claim 3 wherein the gate width is between about 5 and 200 percent greater than the diameter of the largest cable intended to be protected using the sealant-filled enclosure assembly.

5. The method of claim 1 wherein the housing includes a cover member and the first gate member is integrally and unitarily molded with the cover member.

6. The method of claim 1 wherein the first and second gate members and the first and second cable ports are located on the same side of the enclosure cavity.

7. The method of claim 1 wherein:
the housing includes first and second cover members that, when closed, collectively define the enclosure cavity and the cable port;
the first and second gate members are located on the first cover member; and
the port control system further includes third and fourth gate members located on the second cover member;
when the first and second cover members are closed, the first and third gate members are disposed opposite one another to collectively define the first cable port when each of the first and third gate members is deflected into its open position; and
when the first and second cover members are closed, the second and fourth gate members are disposed opposite one another to collectively define the second cable port when each of the second and fourth gate members is deflected into its open position.

8. The method of claim 1 wherein the sealant-filled enclosure assembly is configured such that, when the housing is closed about the connection, the connection displaces an overflow portion of the sealant mass from the enclosure cavity through the first and second ports.

9. The method of claim 1 wherein the sealant is an elastically elongatable gel.

* * * * *